United States Patent [19]

McLennan

[11] Patent Number: 4,702,501

[45] Date of Patent: Oct. 27, 1987

[54] RETAINING COLLAR FOR AN ELASTOMERIC SEAL

[75] Inventor: William R. McLennan, Easton, Pa.

[73] Assignee: Victaulic Company of America, Easton, Pa.

[21] Appl. No.: 712,564

[22] Filed: Mar. 15, 1985

[51] Int. Cl.[4] ............................................. F16L 41/00
[52] U.S. Cl. .................................. 285/197; 285/379; 29/157 T
[58] Field of Search ............... 285/197, 198, 199, 189, 285/205, 206, 191, 379, 161, 177; 29/157 T

[56] References Cited

U.S. PATENT DOCUMENTS

| | | | |
|---|---|---|---|
| 1,062,015 | 5/1913 | Lane | 285/206 X |
| 1,714,789 | 5/1929 | Kolstad | 285/189 X |
| 1,849,604 | 3/1932 | Weatherhead | 285/161 X |
| 3,218,093 | 11/1965 | Carlson | 285/197 |
| 3,362,730 | 1/1968 | Clair et al. | 285/197 X |
| 4,494,780 | 1/1985 | Burnett | 285/177 |

FOREIGN PATENT DOCUMENTS 268923  4/1927  United Kingdom .

*Primary Examiner*—Dave W. Arola
*Attorney, Agent, or Firm*—Abelman Frayne Rezac & Schwab

[57] ABSTRACT

A retaining collar for an elastomeric seal includes an annulus and a skirt depending from the annulus and which is outwardly flared to promote resilient deformation under axial compressive loading and ovalization of the skirt to bring its free edge into intimate seating engagement with the outer surface of a pipe positioned transverse thereto.

20 Claims, 2 Drawing Figures

4,702,501

RETAINING COLLAR FOR AN ELASTOMERIC SEAL

FIELD OF INVENTION

This invention relates to a retaining collar for use in conjunction with an elastomeric seal, and for confining the seal and stressing the seal into intimate sealing relationship with members of plumbing fittings and piping arranged at angles to each other in order to provide a satisfactorily leak-proof assembly between those members.

BACKGROUND OF THE INVENTION

One common means for providing a lateral branch in a piping system is to cut the main pipe, and then to thread the cut ends. The threaded cut ends of the main pipe are then threaded into a fitting providing a threaded lateral branch, which is usually arranged perpendicular to the axis of the main pipe. A branch pipe is then threaded into a branch of the fitting.

Not only is this a time consuming and labor intensive operation, but also, the provision of a tee branch in an existing piping system further requires that compression unions be provided between both cut ends of the main pipe and the tee fitting, it being difficult or impossible to thread the cut ends of the main pipe into the fitting.

Another common way of providing a branch connection is through the use of a saddle. The saddle is provided with an outlet or hole which is placed in alignment with a similarly sized hole in the surface of the pipe. A clamp or strap, passing around the pipe, holds the saddle firmly in position. A suitable seal is located between the saddle and the pipe so as to completely surround the common aperture between the pipe and saddle. The outlet side of the saddle is provided with a means, such as threading, for the attachment of a pipe or other plumbing appurtenance.

It has been proposed, for example, in British Pat. No. 268,923, issued Apr. 14, 1927 to provide a mechanical tee that does not require the cutting and threading of the main pipe. Instead, a hole is bored laterally through the wall of the main pipe, and a lateral connection to the main pipe is made by threading or otherwise securing a branch pipe within the bored hole. This operation, however, requires that an effective and reliable seal be made between the branch pipe and the outer surface of the main pipe.

According to this prior proposal, this is accomplished by providing a collar which is secured on the branch pipe, and which is moved towards the main pipe by a nut threaded on the branch pipe. The collar is employed to confine and compress an elastomeric seal into sealing engagement with the branch pipe, and into sealing engagement with the outer surface of the main pipe. The free edge of the collar is appropriately pre-formed for it to contact or lie closely proximate to the outer surface of the main pipe.

Prior proposed seals for this purpose, as taught in the said prior British patent, have been provided with dual sealing lips, one being substantially cylindrial and the for sealing engagement with the branch pipe, and the other being closely contoured for it to engage the curved outer surface of the main pipe in continuous sealing engagement therewith in a continuous circular zone surrounding the branch pipe.

In constructions of this type, not only must the free edge of the collar be appropriately pre-formed for it to closely contact the outer surface of the main pipe throughout the entire free edge of the collar, but also, the elastomeric seal must be similarly contoured. Otherwise, either uneven or insufficient pressure will be exerted by the collar on the elastomeric seal to cause it to seat properly on the outer surface of the main pipe, or, the elastomeric seal will be overly compressed and distorted by the collar, with consequential cockling of the sealing lips and defective sealing thereby.

Additionally, any deviation of the main pipe from truly round and cylindrical, or any deviation of the diameter of the main pipe from optimum will result in gapping between the free edge of the collar and the main pipe. If such gapping occurs, extrusion of the elastomeric seal can ensue at the gaps, or, the seal can become entrapped between the free edge of the collar and the main pipe, with resultant cutting of the elastomeric seal and also resulting in a defective seal.

A particular disadvantage to the above methods for making piping branch connections and branching appurtenances, is that a specific and singular configuration is required for every size combination of main pipe and branch size. This results in the necessity to provide enormous inventories encompassing the very large number of commonly required combinations of branch pipe size and main pipe size.

SUMMARY OF THE INVENTION

It is an object of this invention to overcome the problems encumbering the prior disclosed sealing arrangements, and, to provide a retaining collar for an elastomeric seal assembly that will automatically adjust itself to out of round pipe, or to pipes of different diameters within the range of manufacturing tolerances thereof, and even further, to provide such a collar that can accomodate itself to pipes within a determined wide range of diameters substantially differing one from the other, thus eliminating the necessity for providing a dimensionally different collar for each of the many diameters of main pipe within said range.

A further object of the invention is to provide a seal assembly incorporating such a collar.

According to the present invention, the collar is formed from a material having substantial tensile strength and which is of sufficiently light gage for a skirt thereof to exhibit peripheral resiliency and flexibility when the collar is subjected to axial loading.

The collar includes an annular portion for arrangement in surrounding relationship with the branch pipe, and a generally conical skirt depending therefrom through a radiused transitional portion of the collar, the skirt terminating in a free edge that is substantially devoid of beading or other edge reinforcement, the intent being that the skirt shall remain resiliently flexible and deformable to the greatest possible extent.

While the collar usually is a unitary member formed from a single thickness of material, for some specific applications, the collar may be formed by plural members nested one within the other, either in face contact, or, interleaved by layers of a different material.

The skirt itself may either be continuous and uninterrupted with its entire surface being generally conical and having its axis coincident with the axis of the annular portion, or, the skirt may be provided with perforations or indentations to receive locating bosses formed on the exterior conical surface of the elastomeric seal, in order to provide specific orientation between the collar and the seal.

The skirt may intentionally be tapered towards its free edge or fromed peripherally crenelated or corrugated to enhance its resilience and flexibility.

Further, the free edge of the skirt may either be a continuous uninterrupted line of curvature, or, it may be formed with re-entrant portions for it to be crenelated, scalloped, sinusoidal, saw toothed, or in any other non-rectilinear arrangement, such that the free edge of the skirt will contact the main pipe at closely spaced positions along the free edge of the skirt in a continuous series of spaced points or locations. Continuous peripheral contact of the collar on the exterior surface of the main pipe is thus promoted, either by crushing of the high points on the free edge of the collar, or, by outward bending and deflection of the portions providing the high points on the free edge of the skirt.

In this manner, any axial forces applied to diametrically opposed portions of the skirt wall as a consequence of the main pipe being oversized or undersized will result in a compressive force and an increase in cone angle of the skirt at the points of initial contact, and will be resolved as a tensile hoop stress developed within the skirt. In turn, the tensile hoop stress acts to move those portions of the skirt intermediate the said diametrically opposite portions in a direction to reduce the cone angle of the skirt in said intermediate portions, and to move the free edge of the skirt into continuous line engagement with the main pipe, the peripheral length of the skirt remaining constant without regard to such movements.

If the diametrically opposed points are points lying on the exterior of the main pipe and aligned with the longitudinal axis of the main pipe, such as will occur if the main pipe is undersized relative to the collar, then, the movement of the skirt will be an outward splaying movement of the skirt axially of the main pipe, and an increase in the cone angle of the skirt at said diametrically opposed points. As the peripheral length of the skirt remains constant, outward splaying movement of the skirt will result in a concomitant inward movement of the skirt at all points intermediate said diametrically opposed points. This acts to decrease the cone angle of the skirt at all positions intermediate said diametrically opposed points. In this manner, the skirt is drawn inwardly towards the periphery of the main pipe and into continuous line engagement the external surface of the main pipe.

If initial engagement should occur at diametrically opposed points lying in a plane transverse to the pipe axis, as will occur if the main pipe is oversized relative to the collar, then, exactly the same movement of the skirt will occur, but rotated 90 degrees from the first discussed points.

Due to the increase of the cone angle at said diametrically opposed points and the decrease in the cone angle of the skirt intermediate those points, the skirt will assume an elliptical form when viewed along its central axis. Additionally, the skirt will assume a convoluted form when viewed in side elevation and perpendicular to its axis in the event that the free edge of the skirt initially lies in a plane, or, will assume a modified convoluted form in the event that the skirt has been preformed in convoluted form.

Continued tightening down of the device will cause these movements of the skirt to progress and continue until such time as the entire periphery of the free edge of the skirt comes into contact with the exterior of the main pipe.

The resilient elastomeric seal contained within the collar is thus caused to effect corresponding movements to those of the skirt, such that the elastomeric seal is gently and progressively brought into intimate sealing contact with the exterior wall of the main pipe. During this movement, the compressive stresses exerted on the elastomeric seal are substantially equalized, thus eliminating cockling of the sealing lip of the elastomeric seal such as would arise from uneven and unequal stressing of the elastomeric seal.

The sealing face of the elastomeric seal is formed planar in the event that the free edge of the skirt is formed planar, or, in the event that free edge of the skirt is formed to be convoluted, then, the sealing face of the elastomeric seal is correspondingly formed convoluted.

Minimization of distortion of the elastomeric seal produces a most beneficial effect by equalizing the compressive stresses produced in the seal between that portion of the elastomeric seal in engagement with the exterior of the main pipe, and that portion of the elastomeric seal in engagement with the branch pipe.

DESCRIPTION OF THE DRAWINGS

The invention will now be described with reference to the accompanying drawings, which are illustrative of preferred embodiments of the invention, and in which.

DESCRIPTION OF THE PREFERRED EMBODIMENTS

In the following description reference is made to the respective axes of the collar, and which are identified in FIG. 1 as follows:

the Y—Y axis is the central axis of the collar, which is also the central axis of the tee branch or closely coincident therewith and parallel thereto, the Y—Y axis also representing a radius perpendicular to the longitudinal axis of the main pipe;

the X—X axis is an axis perpendicular to the Y—Y axis, and which lies in a plane perpendicular to the longitudinal axis of the main pipe;

the Z—Z axis is an axis perpendicular to the Y—Y axis, and which lies in a plane including the Y—Y axis and also including the longitudinal axis of the main pipe.

the X—Y, Y—Z and X—Z planes are planes mutually perpendicular to each other and which respectively include the X—X and Y—Y axes, the Y—Y and Z—Z axes, and the X—X and Z—Z axes.

Figure 1:
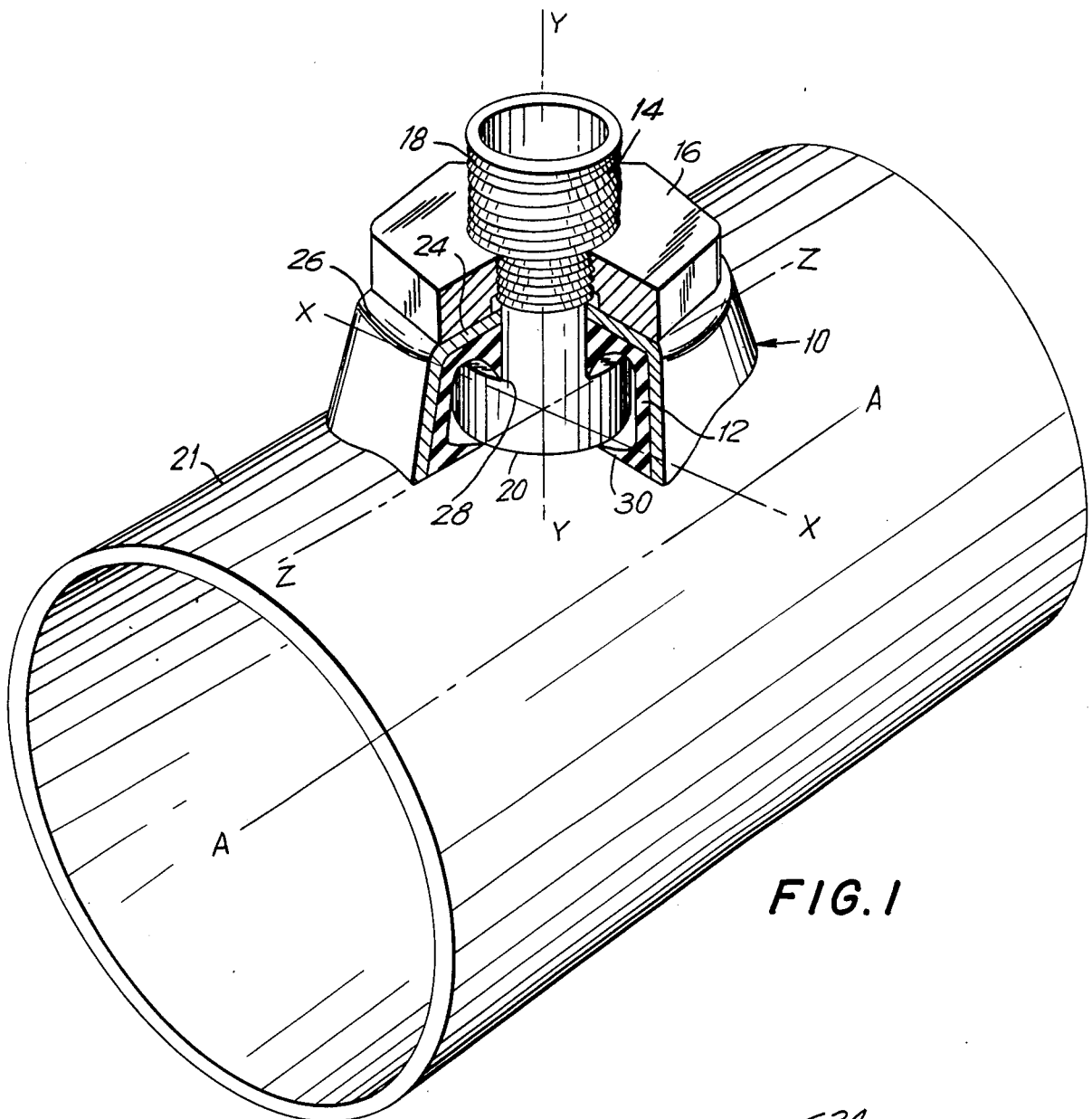
FIG. 1 is a fragmentary perspective view illustrating the collar of the present invention when in use in conjunction with a main pipe and a tee branch fitting, alternative form of the collar being shown in FIGS. 1A and 1B.

FIG. 1 illustrates a basic construction of collar 10 in combination with an elastomeric seal 12, and which is secured about a tee branch 14. The tee branch 14 extends through a hole 20 bored through a main pipe 21, the longitudinal axis of the main pipe being indicated by the chain line A—A.

The collar 10 is comprised of a cup-shaped annulus of any suitable material, such as metal or plastics, a suitable material being hot rolled steel having a nominal thickness of 0.075", the collar having been formed by stamping, pressing, spinning, hydroforming, or the like, and optionally subsequently having been annealed to remove stresses produced therein by the forming operation, and optionally subsequently having been hardened by heat treatment.

The collar includes a skirt 22, which is connected with an annular portion 24, through a radiused transitional portion 26. Instead of being radiused, the transitional portion 26 may be a relatively non-existant, such that the skirt and the annular portion progress substantially directly into each other.

In its simplest form, as intended for use with tee branches of very large diameter pipes, the entire free edge 36 of the skirt 22 will lie in the XZ plane.

In the evennt that the collar is for use with a tee branch of a relatively small diameter main pipe, then, the free edge of the skirt 22 is formed to be curvilinear, the curvilinear edge being a development of the curved exterior surface of the main pipe 22 and the intersecting frustoconical skirt of the collar 10.

The collar 10 confines and compressively stresses the elastomeric seal, the illustrated elastomeric seal 12 being of inverted L-shape, and terminating at its respective ends in a cylindrical seal portion 28 and an annular seal portion 30.

The elastomeric seal, as is well known in the art, may be formed from any suitable rubber-like material, such as neoprene rubber, silicone rubber or the like.

Figure 1A:
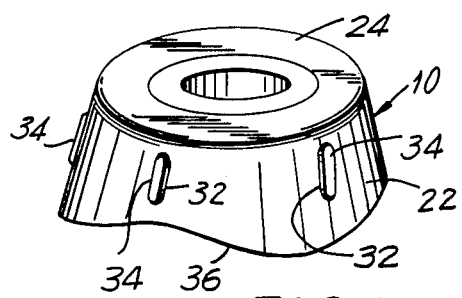

Optionally, the elastomeric seal 12 may be adhered within the collar 10 in its correct orientation relative thereto, such that the collar and seal can be handled as a unitary assembly. Further, optionally, and as shown in FIG. 1A, the elastomeric seal may be attached within the collar 10 by bosses on the seal that extend through corresponding appertures in the collar 10, such that the elastomeric seal and the collar interlock with each other in correct relative orientation, this again permitting the collar and seal to be handled as a unitary assembly.

Figure 1B:
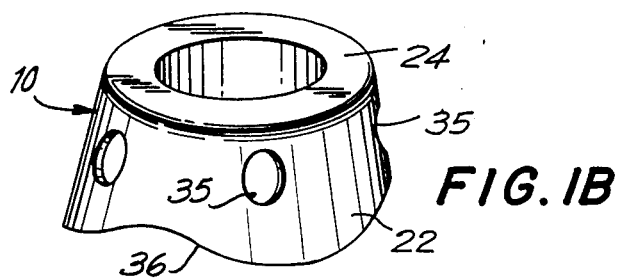

Alternatively, and as shown in FIG. 1B, the skirt 22 of the collar may be inwardly or outwardly dimpled, and the seal provided with correspondingly shaped dimples such that the collar and seal interlock with each other in their correct orientation.

While in FIG. 1 the collar of the invention and its associated elastomeric seal have been shown in combination with a simple tee branch, comprises of a pipe 14 that has been tack welded or threaded into the hole 20 cut in the main pipe 22, it will be fully apreciated that other forms of attachment and other forms of the tee branch readily can be employed in conjunction with the collar of the present invention, including a shoe that is insertible through the hole 20, and which is then oriented for it to straddle the hole 20 and provide the reaction member for axial tensile stresses imposed on the tee branch 14.

Figure 2:
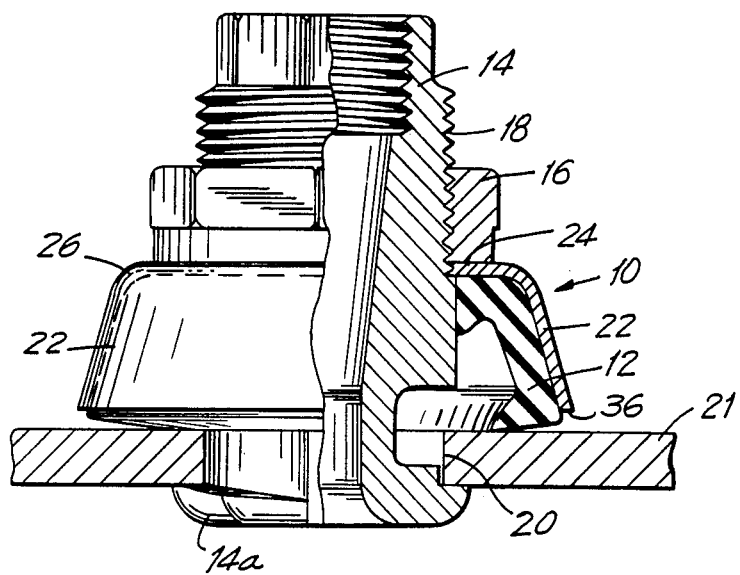
FIGS. 2 and 3 are respectively a partial cross-section and a full cross-section through alternative forms of quick-connect fittings incorporating the collar of the present invention.
Figure 3:
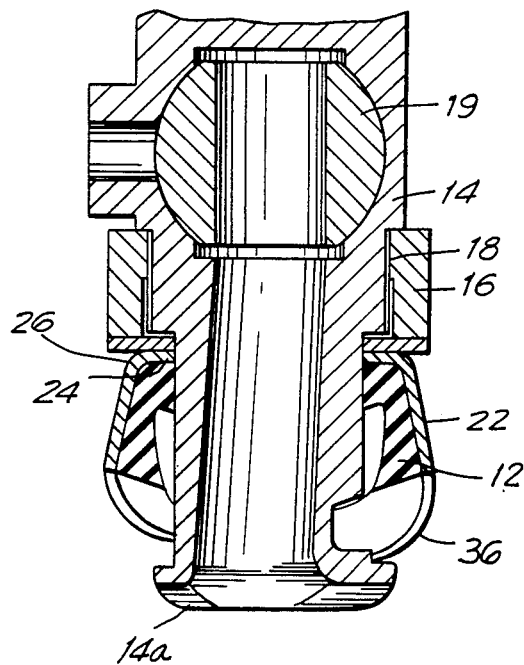

Such constructions are illustrated in FIGS. 2 and 3, the former illustrating a quick-connect connector similar to that disclosed in co-pending application U.S. Ser. No. 619,802, but instead providing a tee branch, the latter illustrating such a connector in combination with a ball valve 19. In FIGS. 2 and 3 the tee branch 14 is shown as having a shoe 14a so configured that can be inserted into a blind hole 20 formed in a plate or a pipe, in the manner previously disclosed, and which also permits assembly of the nut 16 onto the tee branch 14 from the shoe end, as previously disclosed.

Figure 4:
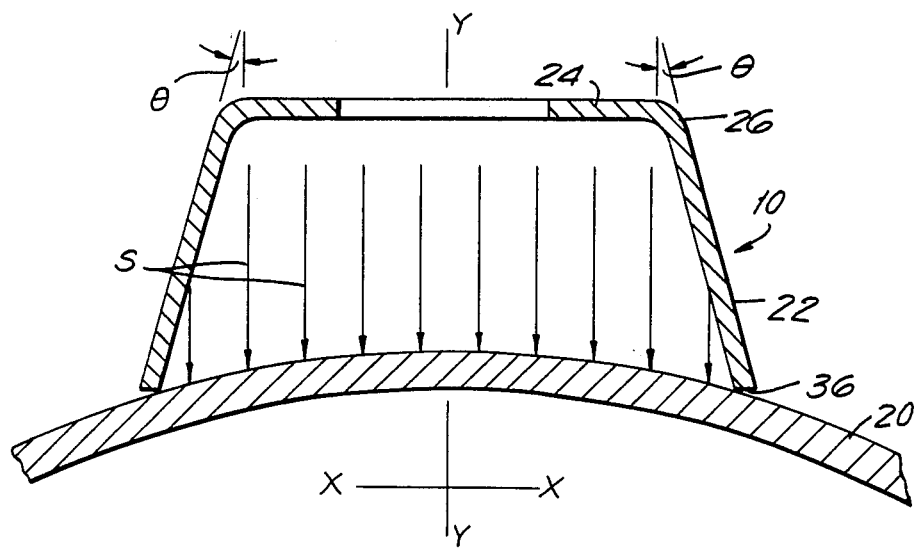
FIG. 4 is a transverse cross-section through a main pipe and a collar of the present invention in which the pipe is of optimum diameter as related to the dimensions of the collar, FIGS. 4A and 4B illustrating alternative constructions of the collar in cross-section.
Figure 5:
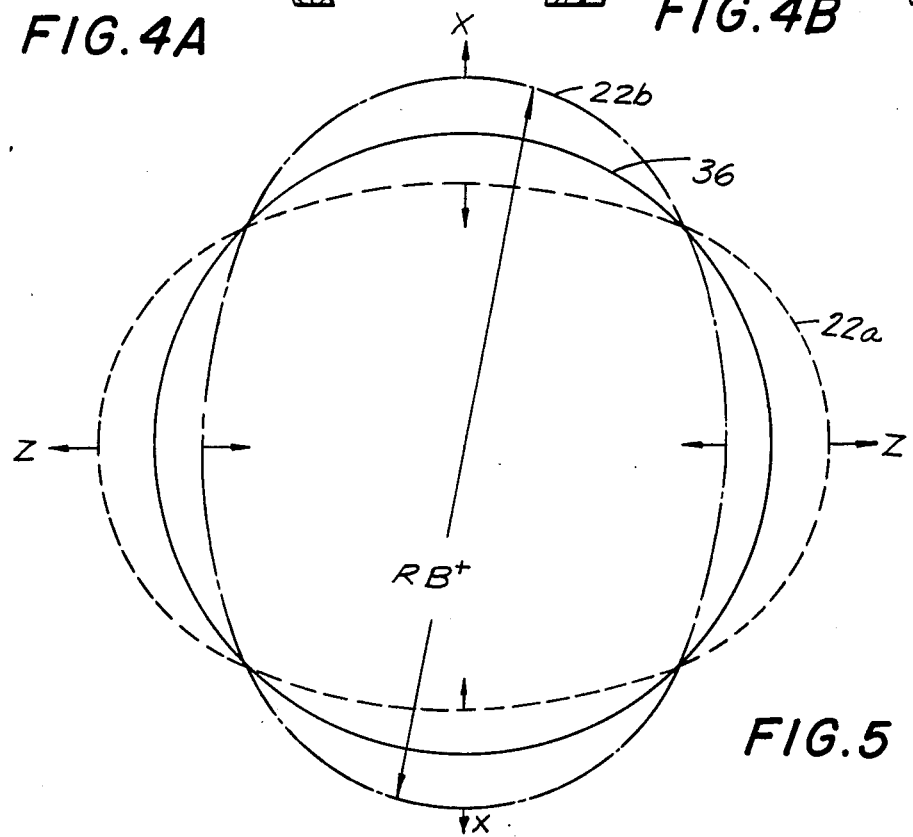
FIG. 5 is a diagram illustrating the initial shape of the free edge of the collar prior to stressing, and the changes in shape of that edge due to stressing at diametrically opposite points.

Referring now to FIGS. 4 and 5 of the drawings, the invention of the present application is discussed with reference to its basic underlying concept.

Central to the present invention is the requirement that the skirt 22 diverge axially from the central annulus 24 and the transitional radius 26, if such is provided. The divergence, which is indicated by the angle 0 will be chosen in dependence on the constructional parameters of the collar, but will lie within the range of 5°–15° relative to the Y—Y axis.

A further decrease of that angle will tend to inhibit sliding movement of the skirt on the main pipe surface, particularly in the direction of the Z—Z axis.

A further increase in that angle will tend to reduce the capability of the skirt to assume an eliptical form, and increase the possibility of collapse of the skirt under compressive loading.

In FIG. 4, the collar 10 is shown in association with a main pipe 20 of optimum external diameter as related to the configuration of the collar 10, which, in this illustration is shown as having a pre-formed free edge 36 of the skirt 22 which conforms exactly with the arc of the main pipe outer surface. As is later discussed, such an optimum condition is so unlikely to occur in practice as to be discountable for practical purposes.

In the unlikely event that the curvature of the pipe and the curvature of the free edge of the skirt 22 conform exactly with each other, then, a compressive force exerted on the collar in the direction of the Y—Y axis will result in a compressive stress in the collar that is equally distributed throughout the entire periphery of the collar, as indicated by the arrows S. If this optimum condition does fortuitously occur, then, the free edge 36 of the collar 22 will contact the exterior of the main pipe 20 in continuóus line engagement throughout the entire peripheral extent of the skirt 22, i.e., there will be no gaps between the main pipe and the skirt at any point along the entire extent of the free edge 36. This is the optimum condition that is sought after, particularly in moderately high to high-pressure tee branch couplings, but which is seldom obtainable using collars such as are taught in the prior art.

Such prior art collars have been intentionally formed to be rigid and resist flexure and deformation, it being entirely usual to employ cast metal collars which preclude flexibility of the skirt, or, collars of relatively heavy cross-section that are inherently resistent to flexure and deformation of the skirt.

Figure 4A:
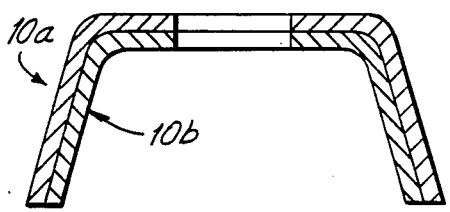

In contradistinction, the collar of the present application intentionally is formed with a flexible and deformable skirt for the reasons later discussed with respect to FIGS. 5 through 9. Further, in order to enhance the flexibility of the collar while retaining its ability to absorb hoop stresses, the collar may be of dual layer construction, as illustrated in FIG. 4A, in which two such collars 10a, 10b of light gauge anre nested one within the other. Two or more such layerings of the collar may be provided, be pending on the specific application envisaged, the respective layers being tack welded to each other, or otherwise secured, at their annular portions.

In this manner, the respective layers can move relative to each other, and act in conjunction to distribute and equalize the compressive stress and the resulting hoot stresses between the respective layers.

Figure 4B:
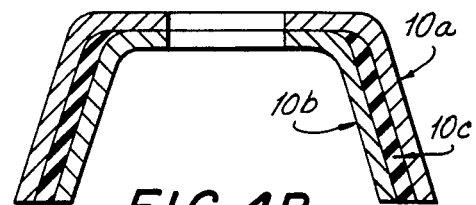

Additionally, and as illustrated in FIG. 4B, the respective layers may be interleaved with a layer of a plastic material 10c to further promote such relative movement.

Provided that the skirt 22 diverges outwardly from the annulus 24 to its free edge 36, then, upon the application of an axial compressive force to the optimum arrangement of FIG. 2, equal radially outward stresses will be exerted on the skirt 22 throughout the entire extent of the skirt 22, and these will be resolved in a hoop stress circumferentially of the skirt 22. No deformation of the skirt 22 will occur, except extremely minor movements due to elastic deformation of the skirt, up to the compressive stress at which the skirt ruptures, i.e., axial spitting of the skirt occurs.

This situation is illustrated in the diagram of FIG. 5 as the full line 36 of contact of the free edge of the skirt 22 with the external surface of the main pipe 20.

Figure 6:
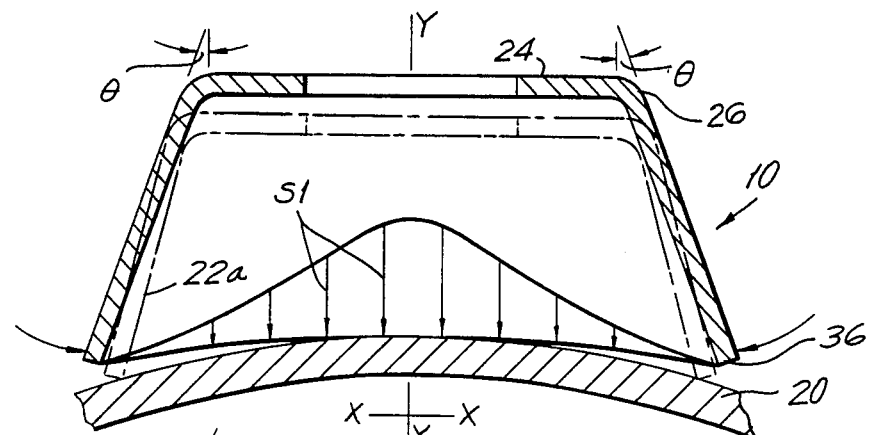
FIGS. 6 and 7, respectively, are diagramatic cross-sections through a main pipe and a collar in which the pipe diameter is less than the collar contour curvature.
Figure 7:
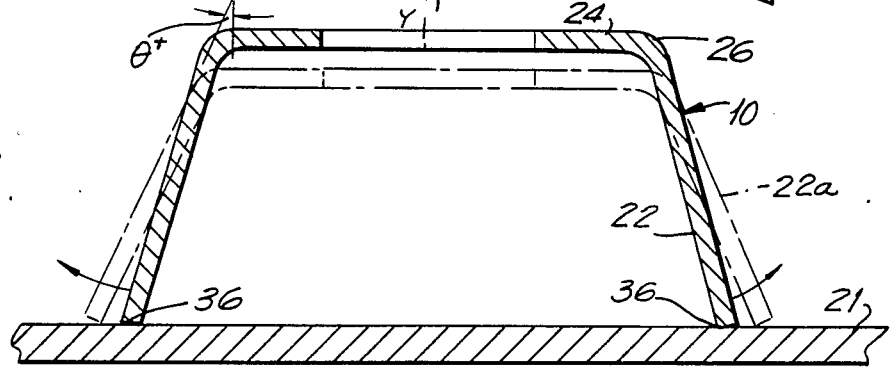

If, as is illustrated in FIGS. 6 and 7, the same collar is applied to a main pipe 21 of less than optimum diameter, then, a totally different distribution of stress in the skirt occurs.

As is illustrated in FIG. 6, upon the commencement of compressive stress exerted on the collar 10, the entire compressive stress will be concentrated in the Y-Z plane passing through the collar, as illustrated by the arrows S-1 in FIG. 6. This is due to the radius of the exterior of the main pipe 20 being less than the preformed radius of the free edge of the skirt 36, which will engage the pipe 20 only at diametrically opposed points along the Z—Z axis, the remaining periphery of the skirt 22 being spaced from the exterior surface of the main pipe 20, and thus producing a gap of progressively increasing width up to the X-Y plane.

In such a circumstance, and in the event that the collar is rigid as in prior art constructions, then, uneven stressing of the contained elastomeric seal will occur with the highest stress lying in the X-Z plane, and the minimum and possibly insufficient stress ocurring in the X-Y plane Under high-pressure loading, seepage that occurs past the outer periphery of the tee branch 14 will cause pressurization of the interior of the elastomeric seal 12, and is available to produce extrusion of the seal 12 through the progressively increasing gaps occuring up to the X-Y plane.

This problem is obviated according to the present invention by intentionally forming the collar for it to be flexible and deformable, in order to produce the effect illustrated in chain dotted lines in FIGS. 6 and 7.

Referring now to FIG. 7, on the initiation of compressive stress exerted on the collar 10, the free edge 36 of the skirt 22 will engage the exterior surface of the main pipe 20 in the Y-Z plane.

Continued increase of the compressive stress will result in the skirt 22 deflecting outwardly in the direction of the Z—Z axis and sliding axially oppositely along the main pipe 20 at its opposite sides, as indicated in chain-dotted lines 22a in FIGS. 5, 6 and 7. Elongation of the collar along the Z—Z axis will cause the skirt 22 to assume an elliptical form, the major axis of the ellipse lying parallel to the Z—Z axis. Due to this elongation of the collar 10 along the Z—Z axis, and which results in an increase in the angle 0 in the Y-Z plane, a consequent inward movement of the skirt will occur at all positions up to and including the X-Y plane, as indicated in chain-dotted lines 22a in FIGS. 5 and 6 producing a decrease in the angle 0 in the X-Y plane.

Thus, should the pipe be undersized, then, the skirt will deform for it to slide axially of the pipe in the Y-Z plane, and in so doing will rotate the skirt inwardly towards the outer surface of the main pipe 20 at all points. On final tightening down of the coupling, the collar 10 will assume an optimum configuration in which the free edge 36 of the skirt 22 contacts the pipe of different diameter continuously and without gaps throughout the entire extent of the free edge 36, this in turn precluding extrusion of the contained seal.

Figure 8:
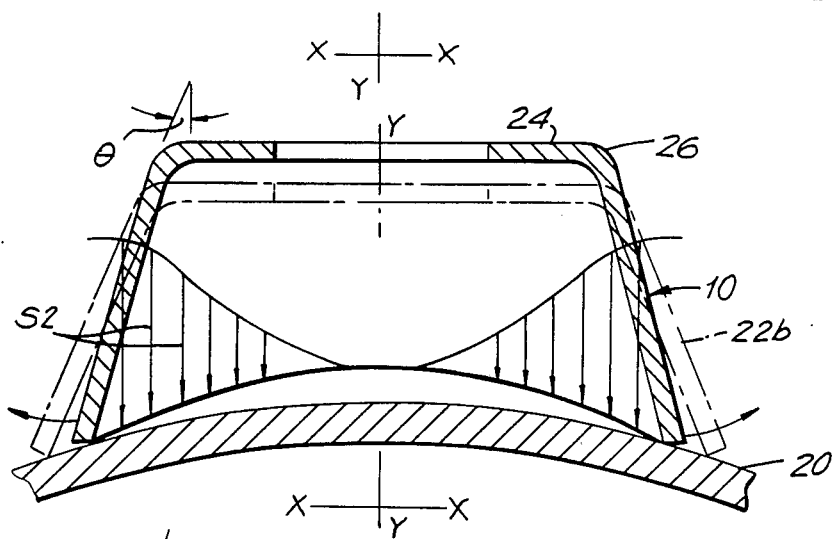
FIGS. 8 and 9 are views corresponding with FIGS. 6 and 7, but showing the collar in association with a main pipe of greater than the collar curvature.
Figure 9:
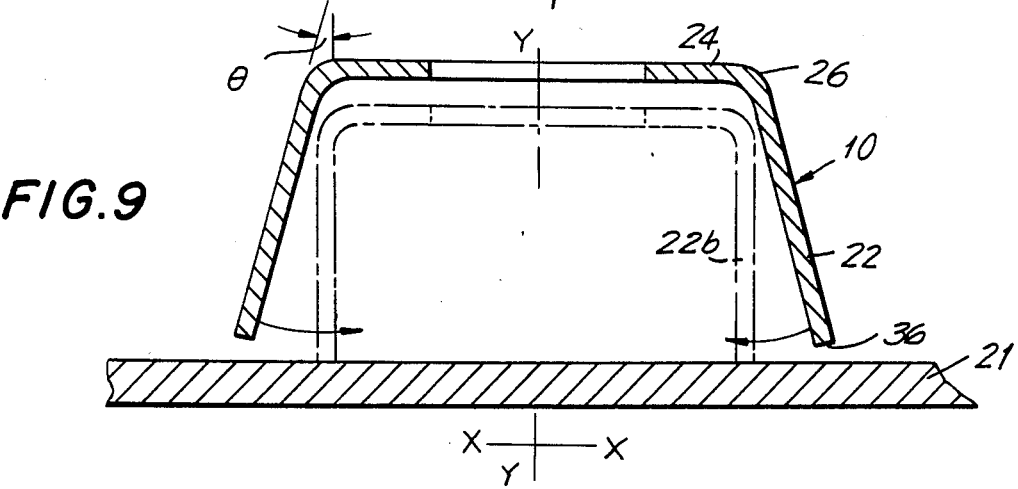

A similar situation will arise in the event that the main pipe 20 is of a radius greater than tlfat to which the free edge 36 of the skirt 22 has been pre-formed, as is illustrated in FIGS. 5, 8 and 9.

In this circumstance, initial engagement of the skirt 22 with the exterior surface of the main pipe 20 will occur in the direction of the X-Y plane, and, a progressively increasing gap will occur between the free edge 36 of the skirt 22 and the exterior surface of the main pipe 20 up to the Y-Z plane. Such gaps provide exactly the same opportunity for extrusion of the elastomeric seal under pressure loading as that previously discussed, and further, produce unequal stresses in the seal as indicated by the arrows S-2, the compressive stress progressively decreasing from the X-Y plane towards the Y-Z plane.

This problem is eliminated by the teachings of the present invention in the manner now discussed with respect to FIG. 8. In FIG. 8, upon the commencement of a compressive load being exerted on the collar 10, the skirt 22 in the location of the X-Y plane will be deflected outwardly as indicated in the chain lines 22b in FIGS. 5 and 8, with a consequential increase in the angle 0 of the skirt in those locations.

This progressively increasing angle of the skirt as the compressive stresses increase, will result in the skirt assuming an elliptical form with its major axis lying in the X-Y plane, and, a corresponding decrease in the minor axis of the ellipse in the Y-Z plane. In turn, there will be a corresponding decrease in the angle 0 of the skirt in that plane.

These inward and outward displacements of the skirt relative to the main pipe will continue until such time as the entire free edge 36 of the skirt 22 is brought into continuous line contact with the exterior of the said main pipe 20 of larger diameter, to the total elimination of gaps between the free edge of the skirt and the exterior of the main pipe 20.

As is stated above, in those circumstance where the main pipe 20 is of large diameter relative to the collar 10, then, it becomes unnecessary to pre-form the free edge 36 of the skirt 22 for it to be curvilinear. Instead, the free edge 36 of the skirt 22 can lie in a single plane. Upon the application of load to the collar, and in the same manner as discussed above with respect to FIGS. 4 and 5, elongation of the skirt will occur along the Z—Z axis, with a corresponding drawing-in and rotation of the skirt along the X—X axis in order to eliminate any gaps that might be present between the free edge 36 of the skirt 22 and the exterior surface of the main pipe 20.

This ability carries with it the added benefit that, as is illustrated in FIGS. 4 through 9, that a collar having a pre-formed curvature of the free edge 36 of the skirt 22 has universal application to any one of a range of pipes falling within a determined range of diameters, thus eliminating the need to provide collars of determined dimensions for each different diameter of main pipe falling within the determined range.

For example, and most surprisingly, a single collar according to the present invention can be employed with equal facility in conjunction with main pipes having an external diameter as large as 100 inches or greater and as small as 8 inches. Thus, instead of requiring some eighteen collars of different dimensions, and also eighteen elastomeric seals of dimensions appropriate to those collars, only a single collar and a single seal are required to accomodate each and every one of main pipe sizes falling within that range. When used with smaller diameter pipes, a single collar and seal can readily accommodate all diameters of pipes from 3 inches up to 6 inches.

The ability of the skirt to deform under axial loading, will progressively decrease as the gauge of the material forming the collar is increased, and while it will increase as the gauge of the material is decreased, an ultimate point will be reached at which the collar will collapse axially under compressive loading instead of deforming as intended.

The ability of the skirt to deform is a function of many variables, including the material from which the collar is formed, and the nominal diameter of the skirt as related to the wall thickness of the skirt. It has been found in practice that the wall thickness must lie in the range of 2% to 5% of the nominal diameter of the skirt for the skirt to satisfactorily deform as intended.

It is further found that the flexibility and deformability of the skirt can be enhanced by forming the skirt tapered towards its free edge 36, as can readily be accomplished by forming the collar as a spinning or stamping.

The determined range of nominal pipe diameter than can be accomodated by a single collar can be further increased by forming the collars as now discussed with reference to FIGS. 10 through 16 of the accompanying drawings.

Figure 10:
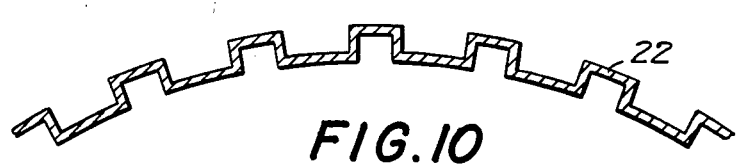
FIGS. 10, 11 and 12 are fragmentary transverse cross-sections through the skirt of the collar, and illustrating various alternative formations thereof, FIG. 11A illustrating a further embodiment.
Figure 11:
Figure 12:

FIGS. 10 through 12 illustrate fragmentary cross-sections through the skirt 22 taken in the X-Z plane, each of which has been configured to enhance the resilliency and flexibility of the skirt 22.

Figure 11A:
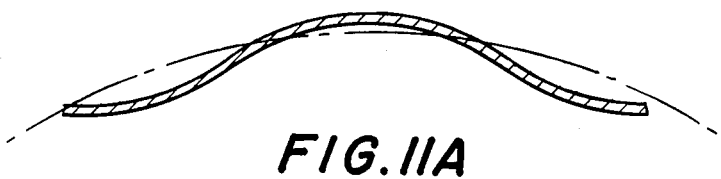

In FIG. 10, the skirt is shown as having been circumferentially crenelated. In FIG. 11 the skirt is shown as having been circumferentially sinusoidally pleated, and in FIG. 11A as undulating. FIG. 12 shows the skirt as having been pleated in a saw-tooth manner. The formation in the skirt may extend through the entire axial extent of the skirt, or be limited to portions of the skirt adjacent to the free edge thereof.

Each of these variations, or modifications thereof, will materially enhance the ability of the skirt to deform along the appropriate X—X or Z—Z axis, while permitting controlled increase in the peripheral length of the effective free edge 36. Such formations as illustrated in FIGS. 10 through 12 will, of course, inhibit continuous line contact between the free edge 36 of the skirt 22 and the exterior surface of the main pipe 20. Instead of being entirely continuous, the contact will then be in a series of closely spaced positions, the closeness of spacing of those positions depending on the pitch of the formations employed.

While such formations serve admirably in relatively low-pressure applications, they are to be avoided in higher pressure applications, as the tensile hoop stress produced in the skirt is materially reduced.

Figure 13:
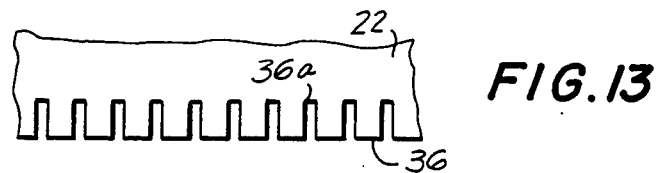
FIGS. 13–16, respectively, are fragmentary front views of the free edge of the skirt showing various modifications thereto.
Figure 14:
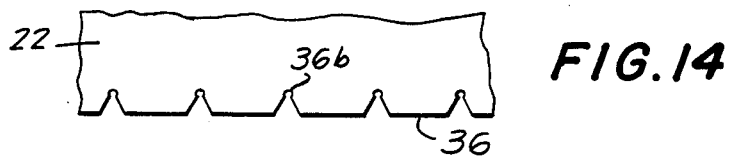
Figure 15:
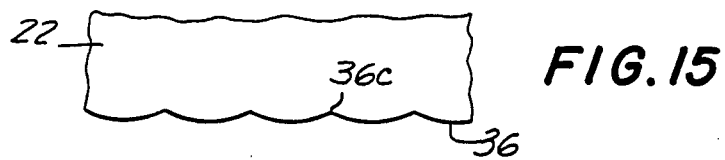
Figure 16:
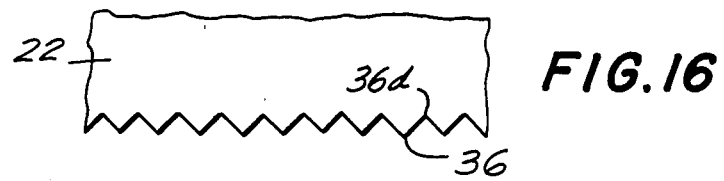

As an alternative, and as is illustrated in FIGS. 13 through 16, the major portion of the skirt can be formed conical, such that substantial hoop stresses can be absorbed therein, and the free edge 36 of the skirt can be formed with reentrant portions extending axially of the skirt in the direction of the Y—Y axis. Such reentrant portions can include spaced slots 36$a$ as shown in FIG. 13, spaced notches 36$b$ as shown in FIG. 14, spaced scallops 36$c$ as shown in FIG. 15, or, a continuous sawtooth edge 36$d$ as shown in FIG. 16.

In each of the embodiments of FIGS. 13 through 16, at the time compressive stress is exerted on the collar 10, those edge formations lying in the X-Y or Y-Z planes or closely adjacent thereto have the ability of separately deforming and rotating outwardly of the collar, thus permitting axial movement of the collar along the Y—Y axis to be increased, thus, to conform to an even wider range of external diameters of the main pipe 20.

Figure 20:
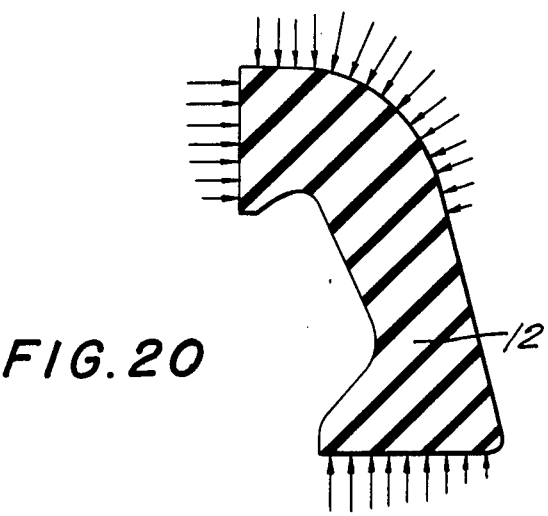
FIG. 20 is a diagramatic illustration of stresses exerted on the sealing gasket.

In the event that the collar is provided with a radiused transitional portion 26, that portion acts as a resilient portion minimizing distortions of the annulus 25 due to flexing movements of the skirt 22, and also acts to direct compressive forces exerted on the contained elastomeric seal, as is illustrated in FIG. 20.

If unequal compressive stresses are exerted on the elastomeric seal in any plane including the Y—Y axis, then, the material of the seal has the opportunity of moving in that plane in order to provide equalization of the distribution of compressive stresses exerted on the respective sealing lips 28 and 30. This internal self-adjustment of the seal is most beneficial in securing positive sealing of the sealing lips 28 and 30 onto the members with which they are associated, and further reduces any proclivity of the elastomeric seal or the sealing lips thereof to buckle or cockle under compressive loading.

Figure 17:
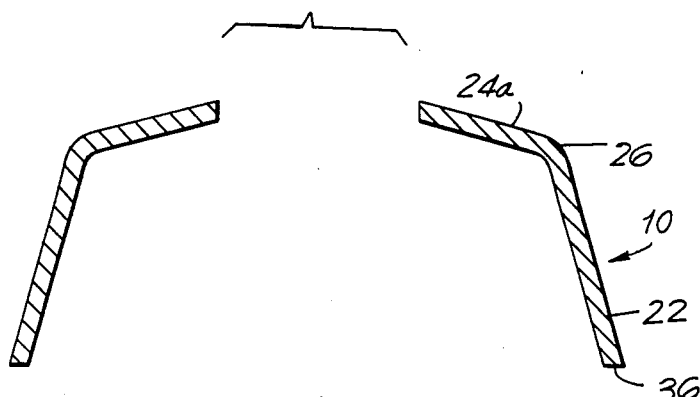
FIGS. 17–19 are cross-sections through the collar illustrating various alternative forms of the annulus thereof.

In FIGS. 1, 1A and 1B, the annulus 24 of the collar 10 is shown as being planar. While the annulus 24 will assume a planar condition under axial compressive loading, it need not necessarily be so prior to axial loading. For example, the annulus 24 may be upwardly conical as illustrated in FIG. 15, or upwardly convexly dished as illustrated in FIG. 16, or provided with one or more annular ridges, as illustrated in FIG. 17.

The stresses generated in both the collar 10 and in the contained gasket 12 can be further equalized by formation of the annulus 24 for it to be other than planer. As is illustrated in FIG. 17, instead of being formed planar, as illustrated in FIG. 4, the annulus 24 can be formed upwardly conical, as shown at 24a, such that the annulus 24a will rotate about the transitional portion 26 as compressive force is applied to the collar 20 and promote outward movement of the skirt 22. As the conicity of the annulus 24a diminishes or disappears, so does the assisting radially outwardly acting force produced in the skirt.

Figure 18:
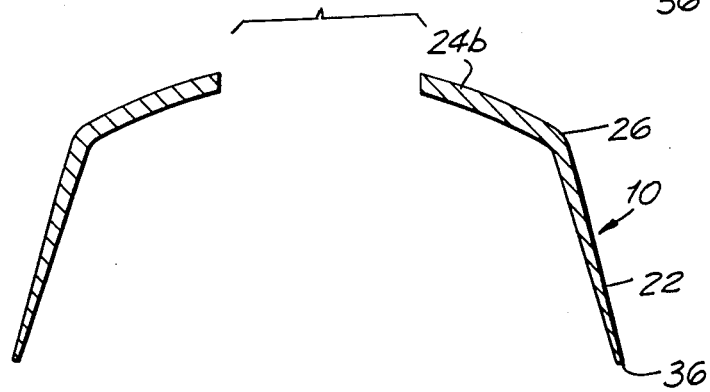

If desired, the annulus can be formed for it to be upwardly convey, as illustrated at 24b in FIG. 18. In this embodiment, any downward movement of the inner periphery of the annulus will result in the compressive force being transferred progressively towards the outer periphery of the annulus, but remaining spaced radially inwardly of the transitional portion 26.

Figure 19:
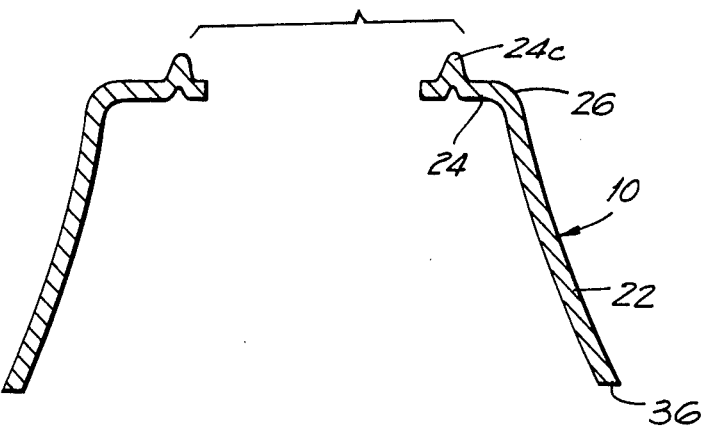

A further alternative is illustrated in FIG. 19, in which the inner circumference of the annulus 24 is provided with an axially extending bead 24c, which is engaged by the nut 16 up to the point where the bead 24c crushes down.

Each of the embodiments of FIGS. 17 through 19 is particularly helpful in avoiding a circumstance that can arise due to carelessness on the part of a workman in the correct positioning of the collar relative to the longitudinal axis of the pipe. By the provision of springiness in the annulus 16, upon tightening down of the nut 24, the collar itself will rotate about the Y—Y axis and self-adjust itself into correct alignment with the longitudinal axis of the main pipe.

It will be appreciated that the above-described embodiments are illustrative of preferred embodiments of the invention, and, that various modifications thereof fall within the scope of the appended claims.

While throughout the preceding description of the preferred embodiments reference has been made to constructions comprises dominantly of metal or metals, it will be understood that the use of metals is in no way essential to the present invention.

In numerous applications, such as in the handling of corrosive materials, the main pipe, the quick-connect connector or other fitting, and, the retaining collar itself may each be formed from a suitable plastics material by injection molding or any other applicable technique, such as hydroforming, sintering, and the like.

Further, particularly in relatively low pressure applications, the retaining collar may be formed from any suitable resiliently deformable plastics material without regard to the materials comprising the components with which it is to be associated, provided that the plastics material has sufficient tensile strength to accommodate the hoop stresses produced in the skirt of the collar. As is well know, the tensile strength of some plastics materials readily can be significantly increased by stress orientation of their molecular structure after molding or extrusion.

What is claimed:

1. A deformable retaining collar for confining and stressing an elastomeric seal of a plumbing branch fitting into seating and sealing contact with the outer surface of any of a plurality of cylindrical main pipes falling within a determined range of external diameters each of greater diameter than the diameter of a free edge of said collar, and into seating and sealing contact with a cylindrical portion of said fitting, comprising:

a thin-walled, cup-shaped annulus formed from a deformable material, including an annular portion, and a conical skirt integral with said annular portion and which is capable of flexure under axial loading of said annulus in a direction towards a free edge of said skirt;

said skirt being flared outwardly of the longitudinal axis of the annulus at an acute angle to said annulus;

said skirt, at least at its free edge, being resilient and deformable upon the application of stress thereto in the direction of the longitudinal axis of said annulus and towards said free edge, and being substantially devoid of edge reinforcement;

whereby, forcing said annulus axially of the cylindrical portion of said fitting and towards the longitudinal axis of said main pipe by means of an internally threaded member threaded onto an external thread of said cylindrical portion. will force said skirt into inital contact with the outer surface of said main pipe at locations spaced axially of said pipe exterior, and causing stressing of said skirt at diameterically opposite points on the free edge thereof, and subsequently will cause outward displacement and elongation of said skirt in the direction of said diametrically opposite points, and concomitant development of tensile hoop stresses in said skirt producing inward movement of said skirt towards said longitudinal axis of said annulus and a decrease in said angle subtended by said skirt relative to the longitudinal axis of said annulus at positions intermediate said diametrically opposite points to bring the entire free edge of said skirt into continuous line engagement with the outer surface of the associated said pipe.

2. The deformable retaining collar of claim 1, in which said skirt has a free edge initially lying in a plane perpendicular to said longitudinal axis of said skirt.

3. The deformable retaining collar of claim 1, in which said skirt has a curvilinear free edge appropriately configured to provide approximate initial line engagement with the radiused outer surface of a main pipe on which the collar is to be seated and which is of a diameter intermediate a determined range of diameters of said main pipe.

4. The deformable retaining collar of claim 1, in which said skirt subtends an accute angle of between 5° and 20° relative to the longitudinal axis of said annulus.

5. The deformable retaining collar of claim 1, in which the thickness of the material of said collar is in the range of 1.0% to 6.0% of the major diameter of said collar.

6. The deformable retaining collar of claim 1, in which said skirt is tapered in thickness towards the free edge of said skirt, for the wall of the skirt to be of greater thickness adjacent said annular portion.

7. The deformable retaining collar of claim 1, in which said skirt includes appertures for the reception of locating members on an elastomeric seal to be positioned and confined within said collar.

8. The deformable retaining collar of claim 1, in which said skirt has a free edge lying in a plane perpendicular to the axis of the collar and is devoid of peripheral reinforcement.

9. The deformable retaining collar of claim 1, in which said skirt is formed axially concave actual perimetral length to be greater than its effective perimetral length.

10. The deformable retaining collar of claim 1, in which said skirt has a free edge formed to provide separate circumferentially spaced axially extending extensions of said skirt, each of which is independently movable relative to the other.

11. The deformable retaining collar of claim 1, in which said annular portion is upwardly inclined relative to a plane transverse to said longitudinal axis and which includes the outer periphery of said annular portion.

12. The deformable collar of claim 1, in nested combination with at least one additional said collar to provide a laminate construction of said cup-saped annulus in which the skirts of the respective collars are capable of movement relative to each other.

13. The deformable retaining collar of claim 1, in combination with an elastomeric seal, further including means securing said elastomeric seal within said collar.

14. The deformable collar of claim 1, in which said skirt comprises a surface of a plain cone having its minor diameter comprised by the outer diameter of said annulus.

15. The deformable collar of claim 1, in which said skirt is axially curvilinear.

16. In combination with a tee branch of a piping system formed from cylindrical pipes:
a thin walled cup-shaped annulus formed from a deformable material including an annular portion, and a skirt depending from said annular portion, said skirt being capable of flexure under axial loading;
an elastomeric seal positioned and confined within said cup-shaped annulus and externally conformed substantially to the internal shape of said cup-shaped annulus; and
means securing said cup-shaped annulus in face engagement with the outer surface of a pipe of greater diameter than the diameter of a free edge of said skirt and in encircling relationship with a tee branch of said pipe, and, for stressing said skirt into continuous line engagement with said pipe and for stressing said contained elastomeric seal into continuous sealing engagement with said pipe;
said skirt of said cup-shaped annulus being flared outwardly of the longitudinal axis of said annulus at an acute angle;
said skirt, at least at its free edge, being resilient and deformable upon the application of stress thereto in the direction of the longitudinal axis of said annulus, and being substantially devoid of edge reinforcement;
whereby, forcing said annulus axially of the cylindrical portion of said tee branch and towards the longitudinal axis of said main pipe by means of an internally threaded member threaded onto an external thread of said tee branch, will force said skirt into initial contact with the outer surface of said main pipe at locations spaced axially of said pipe exterior, and cause stressing of said skirt at diametrically opposite points on the free edge thereof, and subsequently will cause outward displacement and elongation of said skirt in the direction of said diametrically opposite points, and concomitant development of tensile hoop stresses in said skirt producing inward movement of said skirt towards said longitudinal axis of said annulus and a decrease in said angle subtended by said skirt relative to the longitudinal axis of said annulus at positions intermediate said diametrically opposite points to bring said entire free edge of said skirt into continuous line engagement with the outer surface of the associated said pipe.

17. A sealing assembling particularly for use in combination with a direct connect plumbing fitting having a cylindrical portion, said sealing assembly comprising a cup-shaped annulus and an elastomeric seal confined within said annulus;
said cup-shaped annulus being thin walled and formed a deformable material and including an annular portion, and a skirt having a free edge depending from said annular portion, said skirt being capable of flexure under axial loading of said annulus in a direction towards said free edge;
said skirt being flared outwardly of the longitudinal axis of said annulus at an acute angle;
said skirt, at least at its free edge, being resilient and deformable upon the application of axial compressive stress thereto in the direction of the longitudinal axis of said annulus, and being substantially devoid of edge reinforcement;
whereby, forcing said annulus axially of the cylindrical portion of said fitting by means of an internally threaded member threaded onto an external thread of said fitting and towards the longitudinal axis of said a cylindrical main pipe of a diameter greater than the diameter of said skirt, will force said skirt into initial contact with the outer surface of said main pipe at locations spaced axially of said pipe exterior, and cause stressing of said skirt at diametrically opposite points on the free edge thereof, and subsequently will cause outward displacement and elongation of said skirt in the direction of said diametrically opposite points, and concomitant development of tensile hoop stresses in said skirt producing inward movement of said skirt towards said longitudinal axis of said annulus and a decrease in said angle subtended by said skirt relative to the longitudinal axis of said annulus at positions intermediate said diametrically opposite points and into continuous line engagement with said pipe.
said elastomeric seal having dual sealing members, one positioned in the immediate vicinity of the inner periphery of said annular portion and extending axially of said longitudinal axis, the other extending inwardly towards said axis from the free edge of said skirt.

18. A method of sealing a tee fitting having a threaded shank secured to a cylindrical pipe of larger diameter than the diamter of said tee, comprising:
applying an annular sealing member of a resilient and flexible elastomeric material over said tee fitting;
applying a thin walled cup-shaped annular member formed from a deformable material capable of flexure under axial loading of said annulus over said sealing member, said cup-shaped annular member having a configuration complementary to the exterior surfaces of said annular sealing member;
applying a threaded nut to the threaded shank of said fitting, and threading said nut axially of said fitting and into engagement with the adjacent radially extending surface of said cup-shaped annular member to move said cup-shaped annular member into engagement with said pipe at locations tangential to said pipe periphery and aligned with a plane extending diametrically of said pipe and which includes the pipe axis;

then torquing said nut to cause outward splaying of said cup-shaped annular member axially of said pipe at said locations, and in turn to produce a hoop stress in said cupshaped annular member operative to draw the free edge of said cup-shaped annular member radially inwardly and axially towards the outer periphery of said pipe and into continuous line engagement with said pipe, and, to compress said annular sealing member against the pipe periphery and into continuous sealing engagement with said pipe exterior and said tee fitting.

19. A saddle-shaped annular member confining an annular sealing member in continuous sealing engagement with a tee fitting having a threaded shank secured to a cylindrical pipe of larger diameter than the diameter of said tee fitting, and in which said tee fitting extends radially of said pipe, said saddle-shaped cup-shaped member having been produced by the steps of;

applying a thin walled cup-shaped annular member formed from a deformable material capable of flexure under axial loading of said annulus over said sealing member, said cup-shaped annular member having a configuration complementary to the exterior surfaces of said annular sealing member;

applying a threaded nut to the threaded shank of said fitting, and threading said nut axially of said fitting and into engagement with the adjacent radially extending surface of said cup-shaped annular member to move said cup-shaped annular member initially into engagement with said pipe at locations tangential to said pipe peripheral and aligned with a plane extending diametrically of said pipe and which includes the pipe axis;

then torquing said nut to cause outward splaying of said cup-shaped annular member axially of said pipe at said locations, and in turn to produce a hoop stress in said cupshaped annular member operative to draw the free edge of said cup-shaped annular member radially inwardly and axially towards the outer periphery of said pipe, and into continuous line engagement therewith, and to compress said annular sealing member against the pipe periphery and into continuous sealing engagement with said pipe exterior and said tee fitting.

20. In an assembly of a tee fitting having a threaded shank secured to a cylindrical pipe of larger diameter than the diameter of said tee fitting, and in which said tee fitting extends through a hole bored in the wall of said larger diameter pipe, the improvement comprising:

an annular sealing member;

a thin walled cup-shaped annular member formed from a deformable material capable of flexure under axial loading of said annulus and which has been formed in situ into saddle form by the steps of:

applying a said cup-shaped annular member formed from a deformable material over said sealing member, said cup-shaped annular member having a configuration complementary to the exterior surface of said annular sealing member;

applying a threaded nut to the threaded shank of said fitting, and threading said nut axially of said fitting and into engagement with the adjacent radially extending surface of said cup-shaped annular member to move said cup-shaped annular member initially into engagement with said pipe at locations tangential to said pipe periphery and aligned with a plane extending diametrically of said pipe periphery and which includes the pipe axis;

then torquing said nut to cause outward splaying of said cup-shaped annular member axially of said pipe at said locations, and in turn to produce a hoop stress in said cupshaped annular member acting to distort said skirt radially inwardly and axially towards the outer periphery of said pipe and into continuous line engagement therewith, and, to compress said annular sealing member against the pipe periphery and into continuous sealing engagement with said pipe exterior and said tee fitting.

* * * * *